United States Patent
Noda et al.

[11] Patent Number: 6,067,494
[45] Date of Patent: May 23, 2000

[54] CONTROL APPARATUS AND CONTROL METHOD FOR AUTOMATIC TRANSMISSION OF VEHICLE

[75] Inventors: Junichi Noda, Naka-machi; Kazuhiko Sato, Hitachioota; Masahiko Ibamoto, Hitachinaka; Hiroshi Kuroiwa, Hitachi; Mitsuyoshi Okada, Hitachinaka, all of Japan

[73] Assignees: Hitachi, Ltd.; Hitachi Car Engineering Co., Ltd., both of Japan

[21] Appl. No.: 08/818,446

[22] Filed: Mar. 17, 1997

[30] Foreign Application Priority Data

Mar. 15, 1996 [JP] Japan .................................. 8-058813

[51] Int. Cl.⁷ .............................. G06G 7/00; F16H 59/00
[52] U.S. Cl. .............................. 701/54; 701/64; 701/87; 477/107; 477/108; 477/109; 477/115
[58] Field of Search ................................... 701/54, 51, 64, 701/87, 88, 90, 95; 477/107–10, 79, 115

[56] References Cited

U.S. PATENT DOCUMENTS 5,608,626  3/1997  Ibamoto et al. ........................ 701/51
5,826,208  10/1998  Kuriowa et al. ........................ 701/64

FOREIGN PATENT DOCUMENTS 4-72099  11/1992  Japan .
7-139619  5/1995  Japan .

*Primary Examiner*—William A. Cuchlinski, Jr.
*Assistant Examiner*—Yonel Beaulieu
*Attorney, Agent, or Firm*—Evenson, McKeown, Edwards & Lenahan P.L.L.C.

[57] ABSTRACT

A transmission torque of a friction part during a shift is requested in accordance with an input rotation speed and an input torque of the friction part of an automatic transmission and a target torque during the shift determines. An output torque of an engine is reduced in accordance with a difference between the transmission torque and the target torque. A control transmission torque supplied to the friction part is determined in accordance with the torque difference and the transmission torque, thereby an operation force to the friction part is determined and the operation force is supplied to the friction part. A control apparatus and method for the automatic transmission is provided wherein a stable shift time can obtain and a shift shock can be suppressed.

26 Claims, 7 Drawing Sheets

CONTROL APPARATUS AND CONTROL METHOD FOR AUTOMATIC TRANSMISSION OF VEHICLE

FIELD OF THE INVENTION

The present invention relates to a control apparatus and a control method for an automatic transmission of a vehicle having a motive power transmission mechanism wherein driving force of an engine of a vehicle is converted through an automatic transmission and this converted force is transmitted to an axle shaft of a vehicle.

BACKGROUND OF THE INVENTION

In a conventional vehicle comprising a system in which engine speed is shifted through an automatic transmission and is transmitted to wheels of a vehicle, to control most suitably a time for a gear shift, an operation force for giving a friction part is controlled according to a driving condition.

In case where the operation force for giving the friction part is high, during the shift time large unpleasant shift shock is given to crews. On the other hand, in case where the operation force for giving the friction part is low, the shift time goes too far and a service life of the friction part is shortened and further the above slow-footed sense during the shift gives the unpleasant feeling against the crews.

As a prior art technique relating to the above, according to a throttle valve opening value and vehicle speed etc., an operation force for operating a clutch related to the shift and a friction part of a brake is determined from aspects of an empirical knowledge or an experimental result and then the operation force is controlled.

Further, for example, as described in Japanese patent laid-open publication No. 72,099/1992, an operation pressure is determined from an aspect of an empirical knowledge or an experimental result using engine speed and an engine torque.

Further, for example, as described in Japanese patent laid-open publication No. 139,619/1995, from a rotation angular acceleration during a shift time, a control hydraulic pressure of an inertia component and a control hydraulic pressure of an input torque component have been requested and from a sum of the above two control hydraulic pressures an actual control hydraulic pressure for the clutch has been requested.

As stated in above, in case where the operation pressure is determined in accordance with an engine load, for example, every driving condition of an economy mode and a power mode etc. each, it is necessary to prepare a data table for the operation pressure, therefore many processing for a development design requires.

Further, as shown in Japanese patent laid-open publication No. 72,099/1992, in a method where an operation pressure is determined in accordance with an engine speed and an engine torque, a discrepancy occurs between a calculation value of an input rotation speed and an actual value in the torque converter and also a discrepancy occurs between a calculation value and an actual value in the torque according to an amplified toque.

Further, since the above discrepancies varies according to fluctuations of road gradients and vehicle weight, there is a problem in which a stable shift time and a stable shift control can not obtain.

For the above stated reasons, it is necessary to determine proportional coefficients of the engine speed and the engine torque according to the empirical knowledge every shift time each and further many data calibration processing require.

Further, as shown in Japanese patent laid-open publication No. 139,619/1995, in case where the hydraulic pressure of the clutch is requested to establish by dividing the inertia component and the input torque component, there may invite a problem about an increase in a data calibration processing number and an increase in a calculation processing step number.

SUMMARY OF THE INVENTION

An object of the present invention is to provide a control apparatus and a control method for an automatic transmission of a vehicle wherein to realize a shift control having a small unpleasant feeling caused by a shift shock against crews an operation pressure of a friction part can be controlled to obtain accurately and to have a predetermined shift time.

To attain the above stated object, according to the present invention, in a control apparatus for an automatic transmission of a vehicle in which an automatic transmission shifts according to a shift command signal for indicating a shift, the automatic transmission control apparatus comprises a target shift time determination means for determining a target shift time, a transmission torque determination means for determining a transmission torque of a friction part in accordance with an input rotation speed and an input torque of an output shaft of the automatic transmission and the target shift time, a target torque determination means for determining a target torque during a shift of an output shaft of the automatic transmission, an engine output torque alteration means for generating a signal which alters an output torque of the engine in accordance with a difference in torque between the transmission torque and the target torque, a control transmission torque determination means for an actual control transmission torque supplied to the friction part in accordance with the torque difference and the transmission torque, a friction part control means for supplying the operation force to the friction part, and an operation force control value determination means for determining a control value responsive to an operation force for engaging with the friction part in accordance with the control transmission torque and for generating a signal which is based on the control value to the friction part control means.

In case when the transmission torque is smaller than the target torque, the engine output torque alteration means does not carry out to reduce the output torque of the engine, and the operation force can be formed by the hydraulic pressure or the electromagnetic force.

The transmission torque determination means requests the transmission torque in accordance with the shift ratio between before shift and after shift, an inertia moment, a coefficient determined in accordance with the target shift time, the input rotation speed, the input torque, and a predetermined value determined in accordance with a kind of the shift.

The target torque determination means establishes the target torque in accordance with the output torque.

The transmission torque is calculated in accordance with the rotation speed and the input toque, both are inputted to the friction part at the immediately before the shift start. Herein, the immediately before the shift start indicates an immediately before for starting the engagement or the release of the friction part after the shift command sends or a predetermined time after after the shift command sends.

In case when the engine load changes more than a predetermined value during the shift, the operation force to the friction part is controlled in response to the engine load.

Every a predetermined range of the transmission torque each, the apparatus further comprises a moralization means for memorizing a difference between the actual control time and the target control time, therefore the operation force to the friction part can control in response to the engine load.

The operation force to the friction part can control in accordance with the product of the rotation speed by the input torque, both are inputted to the friction part.

DETAILED DESCRIPTION OF THE PREFERRED EMBODIMENT

Hereinafter, one embodiment of a control apparatus and a control method for an automatic transmission in a vehicle according to the present invention will be explained referring to drawings.

Figure 1:
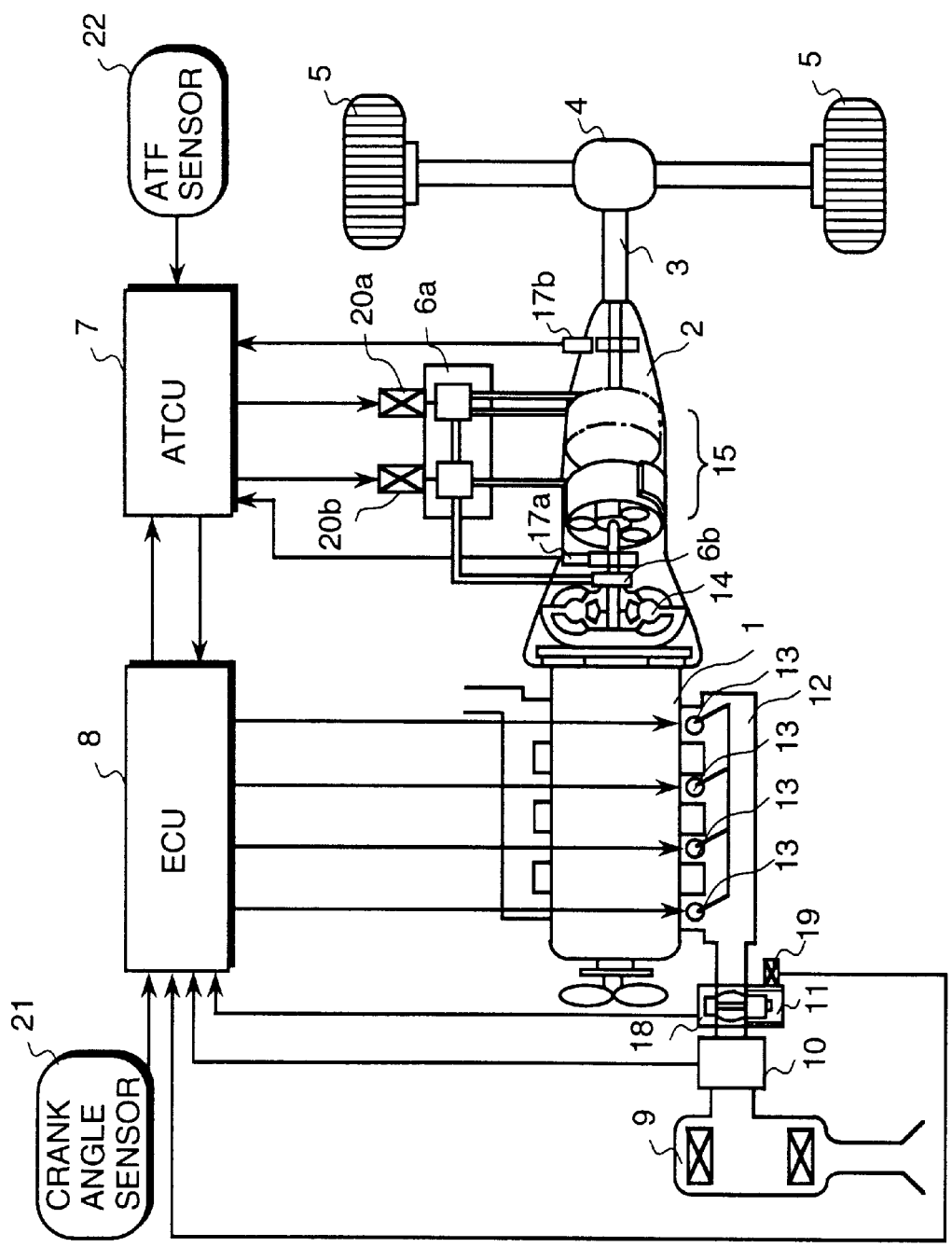
FIG. 1 is a control system construction view of one embodiment of a control apparatus and a control method for an automatic transmission in a vehicle according to the present invention.

FIG. 1 is a control system construction view of one embodiment of a control apparatus and a control method for an automatic transmission in a vehicle according to the present invention.

A control system construction of the control apparatus and the control method for the automatic transmission in the vehicle comprises an engine 1, an automatic transmission 2, a propelling shaft 3, a differential gear mechanism 4, driving wheels 5, a hydraulic pressure circuit 6a of the automatic transmission 2, a pump 6b for producing an operation pressure for supplying to the hydraulic pressure circuit 6a to engage with a frictional part, a control unit 7 (hereinafter, AT converter unit: ATCU) of the automatic transmission 2, and a control unit 8 (hereinafter, engine control unit: ECU) of the engine 1.

AT converter unit (ATCU) 7 communicates to the engine control unit (ECU) 8 by communication circuit lines. The above AT converter unit (ATCU) 7 and the engine control unit (ECU) 8 can give and receive mutually signals.

The control system construction comprises further an air cleaner 9, an air flow sensor 10, a throttle valve controller 11, an intake manifold 12 and injectors 13 (in this embodiment, for one example, four injectors as a four-cylinder type engine).

A torque converter 14 and a gear train 15 are provided in an interior portion of the automatic transmission 2. Further, a turbine rotation speed sensor 17a for detecting an input rotation speed to the automatic transmission 2 and an output shaft rotation speed sensor 17b for detecting an output rotation speed to the automatic transmission 2 are provided in the interior portion of the automatic transmission 2.

The engine control unit (ECU) 8 receives input rotation signals from a crank angular sensor 21, the air flow sensor 10, and a throttle valve opening value sensor 18 etc. and executes an engine rotation speed Ne etc. The engine control unit (ECU) 8 outputs an valve open driving signal to the injector 13 and controls an amount of fuel.

Further, an idle speed control valve 19 (hereinafter, ISC valve) outputs a valve open driving signal and controls a correction air amount. The idle speed control valve (ISC valve) 19 outputs further an ignition signal to an ignition plug (not shown) and controls an ignition time.

On the other hand, AT control unit (ATCU) 7 performs various executions according to input values and vehicle condition information. The above input values are that a turbine rotation speed Nt obtained from the turbine rotation speed sensor 17a, an output rotation speed No obtained from the output rotation speed sensor 17b and an automatic transmission hydraulic temperature Taf obtained from an automatic transmission hydraulic sensor 22 (hereinafter, ATF sensor) etc.

The above vehicle condition information are the engine rotation speed Ne and a throttle valve opening value TVO etc. obtained from the engine control unit (ECU) 8.

Therefore, a most suitable gear combination is selected, the throttle valve open driving signal is outputted to a change-over electromagnetic valve 20a of the hydraulic pressure circuit 6a and a control signal is outputted to a control solenoid 20b, this control solenoid 20b controls a line pressure PL for operating the hydraulic pressure delivered from the pump 6b against the friction part.

Figure 2:
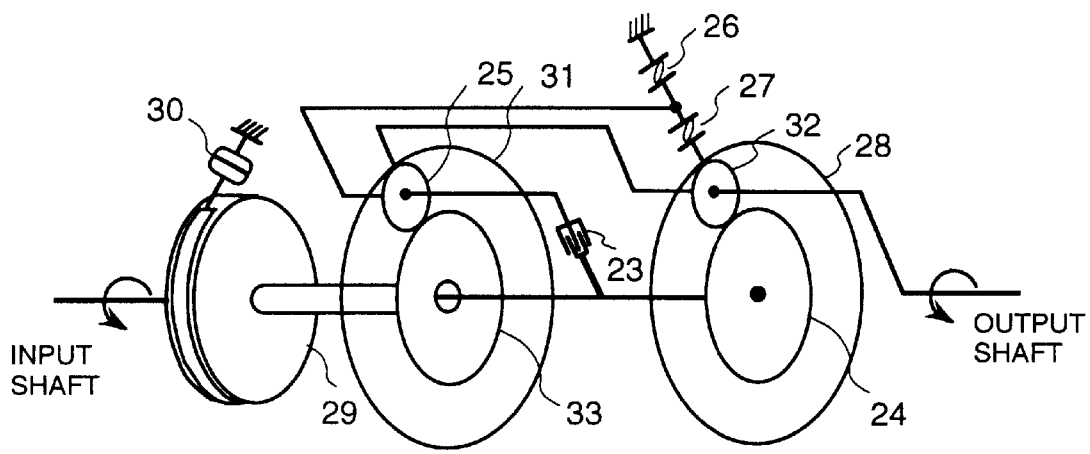
FIG. 2 is a gear construction view showing one embodiment of an automatic transmission in a vehicle according to the present invention.

Next, one example of a gear construction of the automatic transmission 2 will be explained referring to FIG. 2. FIG. 2 shows a most basic gear construction for realizing the shift from a forward first speed to a forward fourth speed and from this figure clutch for retreating and for an engine brake are omitted.

In the gear construction of this embodiment, there are the construction elements having two planetary gears and four friction parts. Namely, the two planetary gears comprise a front pinion gear 25 and a rear pinion gear 32 and four friction parts comprise a band brake 30, a low one-way clutch 26, a high clutch 23 and a forward one-way clutch 27.

The high clutch 23 and a rear side sun gear 24 are connected to the input rotation shaft of the automatic transmission 2. A front pinion gear 25, the low one-way clutch 26 and the forward one-way clutch 27 are connected to an opposite side of the high clutch 23.

When a normal rotation (same direction with the input rotation) torque generates from a side of the high clutch 23, the low one-way clutch 26 presents an engagement condition and consequently a rotation stop condition appears. Further, an opposite side of the forward one-way clutch 27 is connected to a rear internal gear 28.

A front side gear 33 is connected to a brake drum 29, the braking drum 29 presents a rotation stop condition by the engagement of a band brake 30. Further, a front internal gear 31 is connected to a rear pinion gear 32 and the input rotation shaft of the automatic transmission 2.

A relationship between the respective friction part and the gear positions is shown in Table 1.

TABLE 1

| clutch gear position | band braking member | low one-way clutch | high clutch | forward one-way clutch |
|---|---|---|---|---|
| 1st speed | X | ○ | X | ○ |
| 2nd speed | ○ | X | X | ○ |
| 3rd speed | X | X | ○ | ○ |
| 4th speed | ○ | X | ○ | X |

○: engagement   X: release

The engagement and the release conditions are realized by changing over the hydraulic pressure circuit 6 according to the electromagnetic valve 20a by receiving a command from AT control unit (ATCU) 7.

Next, a transfer of an energy in the shift according to the present invention will be explained.

As well known, in case where the rotating body changes its speed, it is necessary to consume a sum of an energy of a rotation inertia component and an energy inputted from the engine 1 and a time to be required for the above consumption is indicated as a shift time.

Herein, an energy Wi of the rotation inertia component is expressed by a following formula (1).

$$Wi = \Sigma(\tfrac{1}{2} \times (\omega i1 - \omega i2)2 \times Ji) \tag{1}$$

wherein, Ji: inertia moment of rotating part; $\omega i1$: angular speed before shift; $\omega i2$: angular speed after shift.

Herein, each of the angular speed of the rotating bodies is in proportion to an input rotation speed, namely the angular speed is in proportion to an angular speed $\omega t$ before the shift of the turbine. The angular speed of before and after the shift is in proportion to a gear ratio of the shift. Accordingly, a following formula (2) is established.

$$Wi = k1 \times \omega t^2 \tag{2}$$

wherein, k1: constant determined by gear ratio and inertial moment; $\omega$: angular speed.

An energy We inputted from the engine control 1 is expressed by a following formula (3).

$$We = \tfrac{1}{2} \times (\omega t - \omega te) \times Tt \times tc \tag{3}$$

wherein, Tt: turbine torque; tc: shift time; $\omega te$: turbine angular speed after shift.

Since the turbine angular speed before and after the shift is in proportion to the gear ratio of the shift similarly to the above stated (1) formula, the energy We is expressed by a following formula (4).

$$We = k2 \times \omega t \times Tt \times tc \tag{4}$$

wherein, k2: constant determined by gear ratio.

Next, the consumption of the energy will be explained by illustrating a shift-up time from the first speed to the second speed in the gear construction of the automatic transmission 2.

At a condition of the friction parts during the shift from the first speed to the second speed, motions carries out such that the band brake 30 is engaged with and the low one-way clutch 26 is released.

Actually, when the band brake 30 is engaged with, the low one-way clutch 26 is automatically released, the shift is performed by stopping the break drum 29 in accordance with the engagement with the band brake 30.

Namely, a surplus energy accompanying by the shift is consumed in the band brake 30. Such a consumption energy Wd is expressed by a following formula (5).

$$Wd = k3 \times Td \times \omega t \times tc \tag{5}$$

wherein, Td: transmission torque; k3: constant determined by kind of shift.

Herein, since, the formula (5) is equal to a sum of the formula (2) and the formula (4), a balance sheet of the energy is expressed by a following formula (6).

$$k3 \times Td \times \omega t \times tc = k1 \times \omega t^2 + k2 \times \omega t \times Tt \times tc \tag{6}$$

Arranging to the transmission torque Td, a following formula (7) is obtained.

$$Td = k\omega / tc \times \omega t + kt \times Tt \tag{7}$$

wherein, $k\omega$: constant determined by constants k1, k2 and k3; kt: constant determined by constants k1, k2 and k3.

Figure 7:
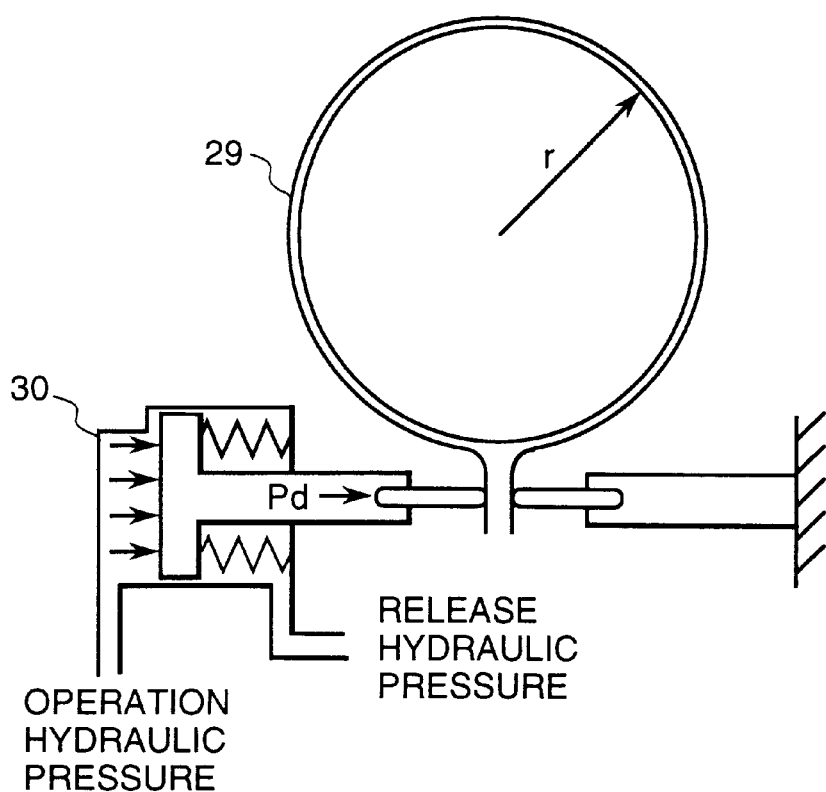
FIG. 7 is a construction view of one example of a band brake and a break drum.

FIG. 7 shows a construction of the band brake. The transmission torque Td is determined in accordance with an operation force Pd for operating to the band brake 30 and a friction coefficient $\mu$ of the band brake 30 and a radius r of the break drum 29 shown in this figure.

Figure 3:
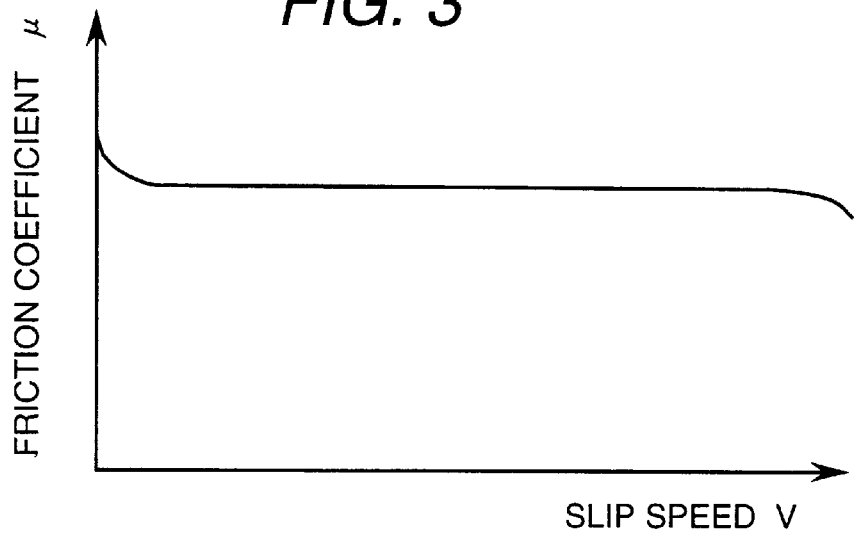
FIG. 3 is a characteristic view showing a relationship between a friction coefficient $\mu$ and a slip speed V of a band brake.

FIG. 3 is a characteristic view showing a relationship between the friction coefficient $\mu$ and a slip speed V of the band brake 30.

In generally, in the band brake employed in the automatic transmission 2 for use in the vehicle, the band brake 30 has a friction coefficient $\mu$ characteristic shown in FIG. 3. A value relating to this friction coefficient $\mu$ characteristic is substantially constant and thereby this above stated value can be regarded as a constant.

It has been well known that the transmission torque Td in the above stated case is in proportion to the operation force Pd. Consequently, the transmission torque Td is expressed by a following formula (8).

$$Td = k4 \times Pd \tag{8}$$

wherein, k4: constant determined by operation force.

Further, to the band brake 30 at the engagement time a servo pressure Pa, which is in proportion to the line pressure PL, is supplied to the operation hydraulic pressure and then a release hydraulic pressure is opened to an atmospheric pressure.

On the other hand, at the release time, inversely the operation hydraulic pressure is opened to the atmospheric pressure and then the servo release pressure Po, which is in proportion to the line pressure PL, is supplied to the release hydraulic pressure.

A relationship between the operation force Pd and the line pressure PL during the engagement time is given by a following formula (9).

$$Pd = ks \times PL - kb \tag{9}$$

wherein, ks: constant determined by operation area and hydraulic pressure circuit of line pressure; kb: reaction force component by spring member etc.

The reaction force component kb is in proportion to an expansion length, however since an expansion during to the operation time is negligible small, this reaction force component kb is allowed to be constant.

With the statements stated in above, a following formula (10) is obtained according to the formula (8) and the formula (9).

$$PL = kp \times Td + km \qquad (10)$$

wherein, kp: constant determined by constants ks, kb and k4; km: constant determined by constants ks, kb and k4.

Accordingly, in case where the line pressure PL is determined in accordance with the transmission torque Td requested by the formula (7), the shift time is controlled at a predetermined value of tc.

Since each of the constants kp and km is easily calculated from basic design values of the friction parts, the control constants can be determined substantially without the data calibration. As a result, according to the present it is unnecessary to have much data calibrations during the development design shown in the prior art.

Further, the friction coefficient $\mu$ in the band brake 30 is made to be constant against the slip speed V, however, as understood from FIG. 3, in where the slip speed V is small, the friction coefficient $\mu$ has a tendency to become large.

To reflect the above stated condition, it is desirable to correct the operation pressure Pd to present small at an area where the turbine angular speed is small.

Figure 4:
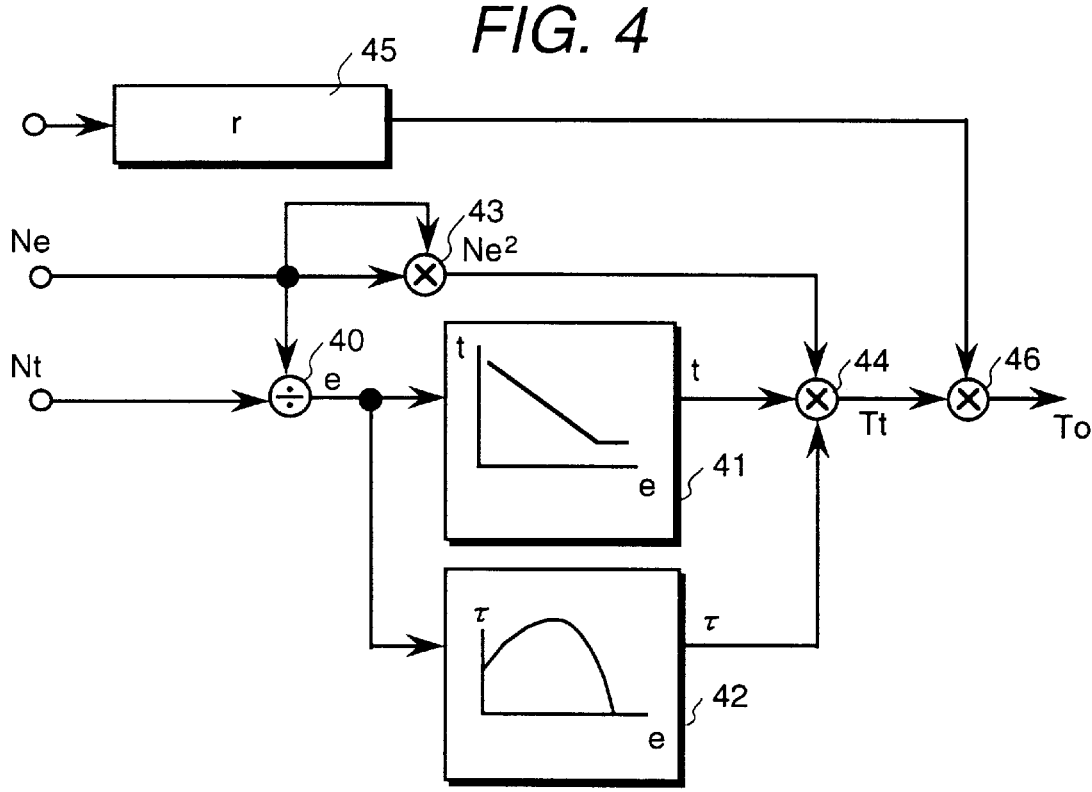
FIG. 4 is a control block diagram showing one example of a turbine torque estimation part.

FIG. 4 is a control block diagram showing a turbine torque estimation part. The turbine torque Tt is estimated through executions shown in FIG. 4. These executions are carried out accompanying by each of the input processing of the measurements relating to the engine rotation speed Ne etc. For example, the above stated executions are carried out repeatedly every a predetermined time each, such as every 10 ms each.

In FIG. 4, in a block 40, a slip ratio "e" of the torque converter 14 is requested by dividing the turbine rotation speed Nt by the engine rotation speed Ne as shown in a following formula (11).

$$e = Nt/Ne \qquad (11)$$

In a block 41 and a block 42, a torque ratio "t" is requested by a torque ratio t characteristic memorized in the torque converter 14 in advance and also a pump capacity coefficient τ is requested by a pump capacity coefficient τ characteristic memorized in the torque converter 14 in advance.

In a block 43, the engine rotation speed Ne squared is requested and in a block 44, as shown in a following formula (12), the torque ratio t and the pump capacity coefficient τ requested beforehand are multiplied and the turbine torque Tt is requested.

$$Tt = t \times \tau \times Ne^2 \qquad (12)$$

In a block 45, a gear ratio at present "r" is requested and in a block 46 an output torque To is requested by multiplying the gear ratio r by the turbine torque Tt.

Figure 5:
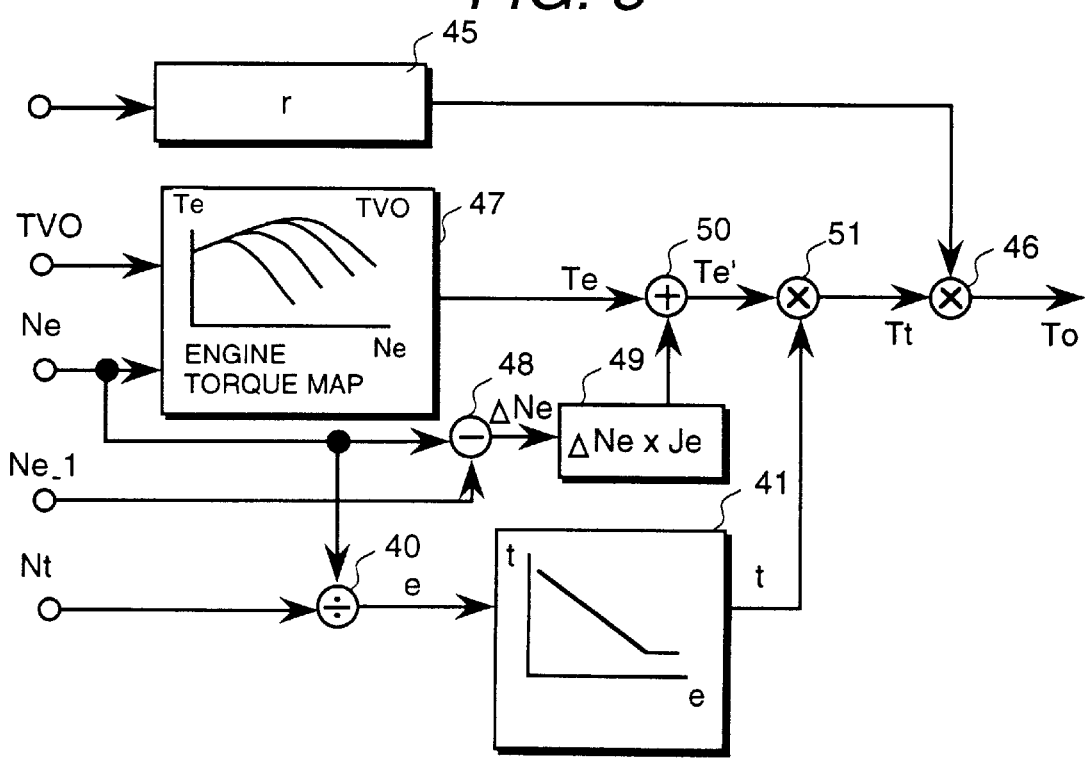
FIG. 5 is a control block diagram showing another example of a turbine torque estimation part according to a different manner from a manner shown in FIG. 4.

FIG. 5 is another control block diagram of another example of an estimation part of a turbine torque Tt which is different from that shown in FIG. 4.

In FIG. 5, in a block 47, the turbine torque Tt is estimated by requesting the engine torque Te in accordance with the throttle valve opening value TVO, the engine rotation speed Ne and a beforehand stored engine torque characteristic map.

In the above method, since the engine torque Te is used in place of the pump capacity coefficient τ, it is necessary to take into a consideration about an inertia moment of the rotation change accompanied by the shift etc.

With the above reasons, in a block 48, an engine rotation speed change amount ΔNe is requested in accordance with a difference between the present time engine rotation speed Ne and a last time engine rotation speed Ne_1. In a block 49, the obtained engine rotation speed change amount ΔNe is multiplied by an inertia moment Jo of the engine 1.

In a block 50, the obtained multiplied value is added to the engine torque Te and then an inertia torque Te' is obtained by the above multiplication. In a block 51, the tribune toque Tt is requested in accordance with the multiplication of the torque ratio t and the inertia torque Te'.

Further, in addition to the above stated method, as a method for requesting the engine torque Te, the engine toque Te can request similarly in accordance with a relationship between an engine intake air amount Qa, or input information about an injector pulse width Ti and the engine rotation speed Ne. However, such an explanation about the another method for requesting the engine torque Te will be omitted from in the present specification.

The turbine torque Tt and the turbine rotation speed Nt requested by the above stated method are converted with the units to a turbine angular speed ωt. The line pressure PL is requested by substituting the obtained units-converted values to the formula (7) and the formula (10).

Figure 8:
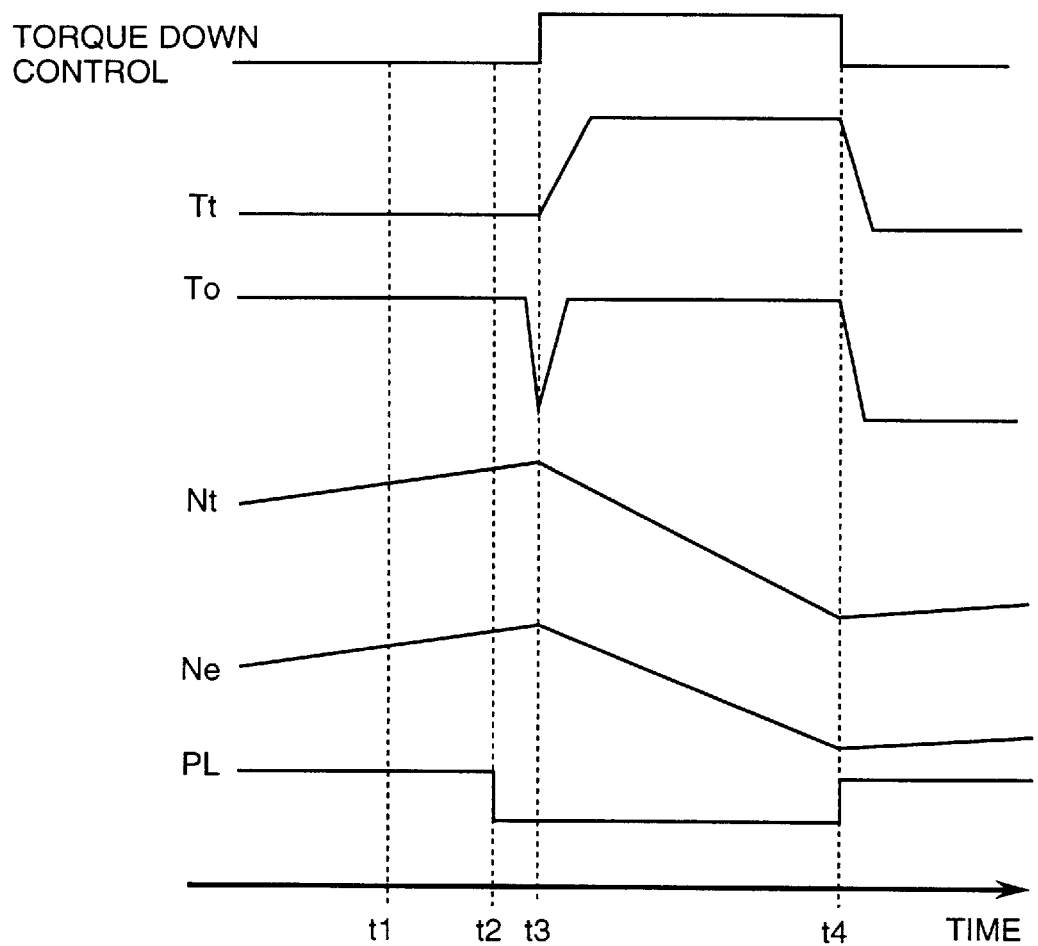
FIG. 8 is a time chart showing one example of a control for a shift according to the present invention.
Figure 9:
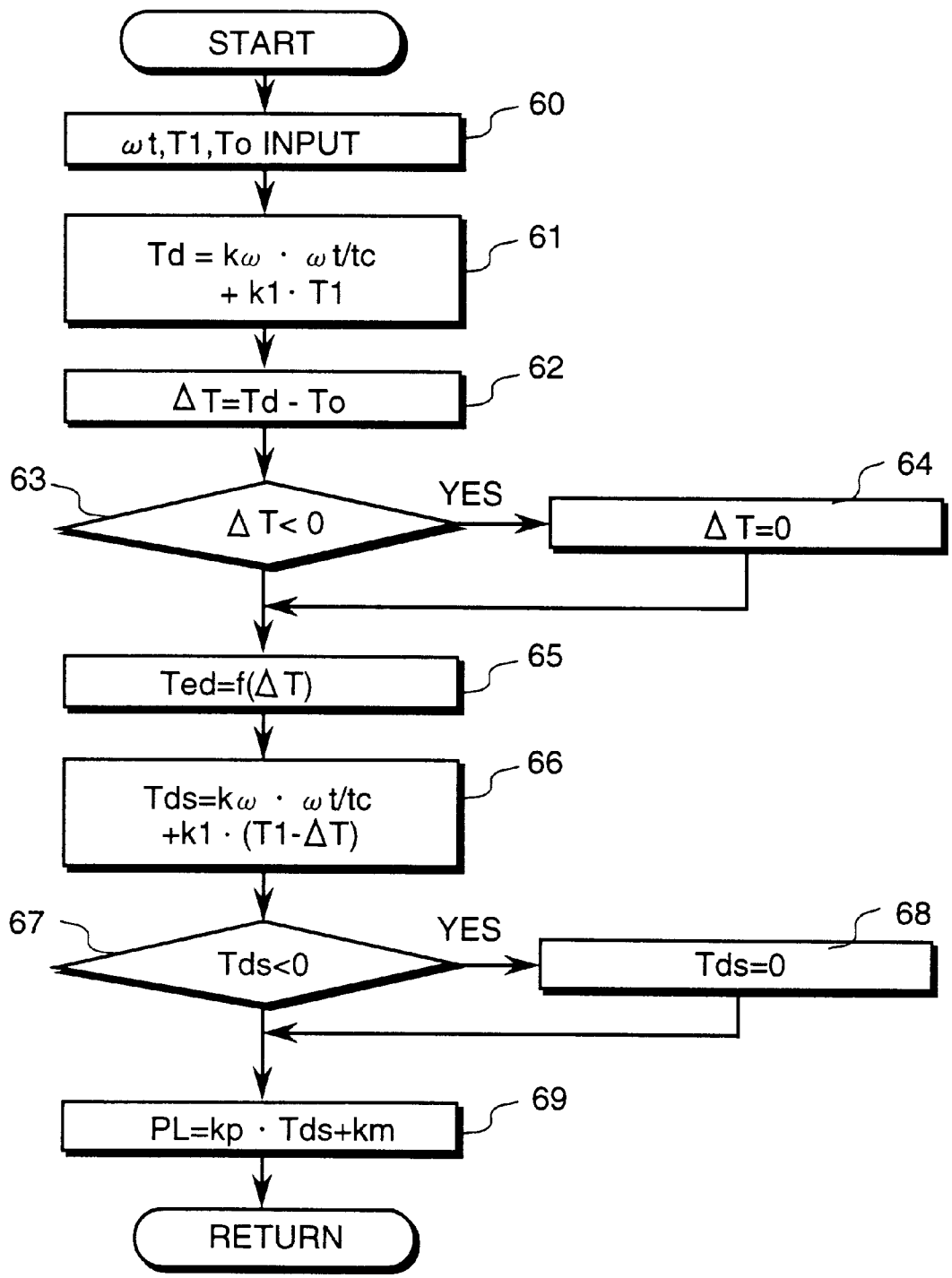
FIG. 9 is a flow chart showing a control for a shift according to the present invention.

FIG. 8 is a time chart showing one example of a control of a shift where the present invention is performed and FIG. 9 is a flow chart showing the control of the shift according to the present invention.

FIG. 8 is an example of a shift-up time. In case where a shift command is sent, at a point after a predetermined time t2 or at a point of a time t3 where the engine rotation start going to lower, the executions shown in a flow of FIG. 9 are carried out.

Namely, in the flow shown in FIG. 9, in a step 60, the turbine toque Tt and the output shaft torque To are requested in accordance with the turbine angular speed ωt and the blocks of FIG. 4. In a step 61, an estimation transmission torque Td is requested in accordance with a predetermined shift time tc, the turbine angular speed ωt and the turbine toque Tt using the formula (7).

Next, in a step 62, a difference between the estimation transmission torque Td and the output shaft torque To is requested and this requested difference is made as a torque difference ΔT.

In a step 63, a sign of the torque difference ΔT is judged, when the sign is negative, in a step 64, the torque difference ΔT is made zero (0). With the above stated method, the output shaft torque To is made an upper limitation value of the estimation transmission torque Td. Since the torque during the shift is set to have the same or smaller than the torque before the shift, therefore the shift shock can be restrained.

In a step 65, a torque down control amount Ted is requested in accordance with the torque difference ΔT. As the torque down control amount Ted, there are various kinds, such as a retard amount for delaying an ignition time of the engine 1, a partial cut of a fuel supply and further a limitation of an air amount in case of an employment of an electronically controlled throttle valve, etc.

In a step 66, an actual control transmission torque Tds is requested by the formula (7) under the consideration of a torque down amount. In a step 67, a sign of the actual control transmission torque Tds is judged, in case the sign is negative, in a step 68, the actual control transmission torque Tds is made zero (0) and in a step 69, the line pressure PL is calculated using the formula (10).

The judgment in the step 67 is performed to prevent the line pressure PL to reach less than km value in case where the turbine torque Tt becomes negative when a driver does not step on an acceleration pedal.

Herein, km value is one determined by the reaction force of the spring member. The shift is enable to carry out when the line pressure PL exceeds at least more than km value.

The line pressure PL and the torque down control amount Ted requested by the above stated method are outputted as the control values at a timing based on the time t2 or the time t3.

Figure 6:
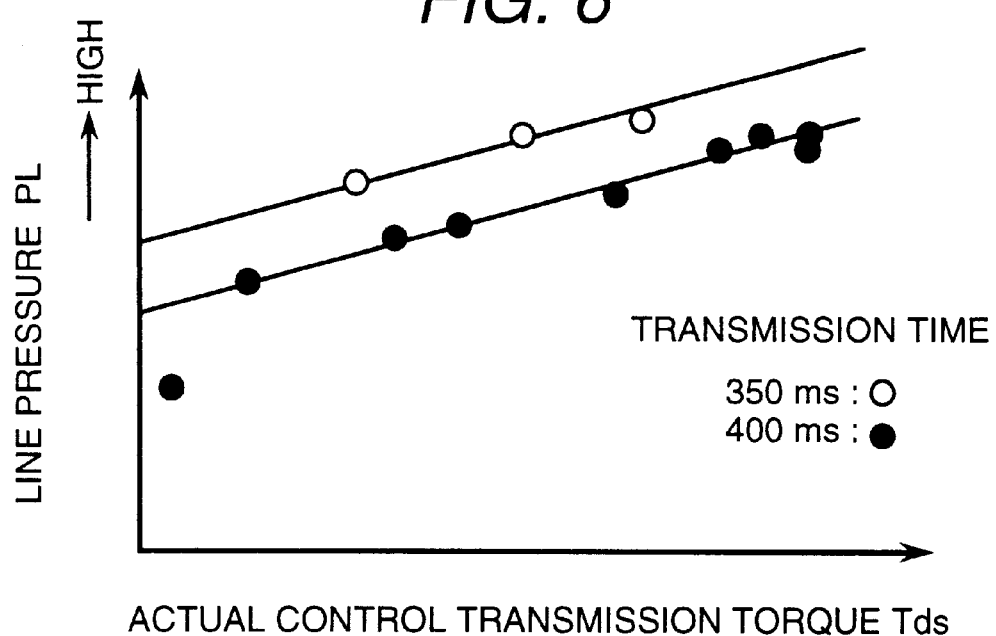
FIG. 6 is an explanatory view showing an experimentation result of a line pressure according to the present invention.

FIG. 6 shows an experimental result about the line pressure according the present invention. In a horizontal axis indicates the actual control transmission torque Tsd, and a vertical axis indicates the line pressure PL.

FIG. 6 shows the cases where the line pressure PL is changed in various ways at one driving condition.

In FIG. 6, the line pressure PL wherein the shift time is about 350 ms is plotted using white circles and further the line pressure PL wherein the shift time is about 400 ms is plotted using black circles.

In FIG. 6, a real line shows a theoretical line pressure requested according to the present invention and there are two theoretical line pressures under the shift time reaching 350 ms and under the shift time reaching 400 ms.

As clearly understood from FIG. 6, in cas e where the line pressure PL is determined using the actual control transmission torque Tds, the shift time can control at constant.

Further, at an area where the actual control transmission torque Tds is small (condition where the acceleration pedal is not step on), to obtain the same shift time the line pressure PL is smaller than the theoretical line pressure shown in FIG. 6.

This causes, as stated in above, according to the characteristic of the friction coefficient $\mu$ of the band brake 30. As a result, in this area the correction for the line pressure PL is necessary taking into the characteristic of the friction coefficient $\mu$.

In the contents as stated in above, it estimates the engine load during the shift is constant. This will be appropriate under considerations where the engine 1 and the vehicle itself have the inertial and further the shift time is very short such as less than 1 second.

However, at the actual driving condition, according to circumferences, the input condition may change, for example, the opening value of the throttle valve may fluctuate largely during the shift.

Therefore, in cases where the opening value of the throttle valve changes largely from a predetermined value and the brake 30 is stepped on, etc., it can change over to the operation pressure at a predetermined value in accordance with the signal of the throttle valve opening value etc. As a result, an abnormal motion can prevent in accordance with the change-over operation.

In the above stated embodiment according to the present invention, the shift time requests strictly, however in the actual automatic transmission, according to an individual difference and a time lapse deterioration etc. of the hydraulic system, even the control value is constant, a time lag occurs between the actual shift time and the requested shift time.

To solve the above stated problem, a difference between an actual shift time tcr (a time between a time t4 and a time t3 shown in FIG. 8) and a time tc is memorized in advance, then the line pressure PL is corrected in accordance with a magnitude of the time lag. As a result, the shift time can control accurately according to this embodiment.

Hereinafter, a method for correcting the line pressure PL will be explained referring to a case where a duty solenoid is used for the control of the line pressure PL, as one exemplification.

In the control method according to the duty solenoid, an output duty ratio DPL with the line pressure PL is memorized as a data table, and a learning correction value SDPL is requested by a following formula (13).

$$DPL = tbl(PL) + SDPL(i) \tag{13}$$

wherein, tbl(PL): conversion coefficient of line pressure—output duty ratio conversion data table.

Further, the learning correction value SDPL takes (i) and this (i) shows the learning correction value exists every area of the actual control transmission torque Tds each.

Figure 10:
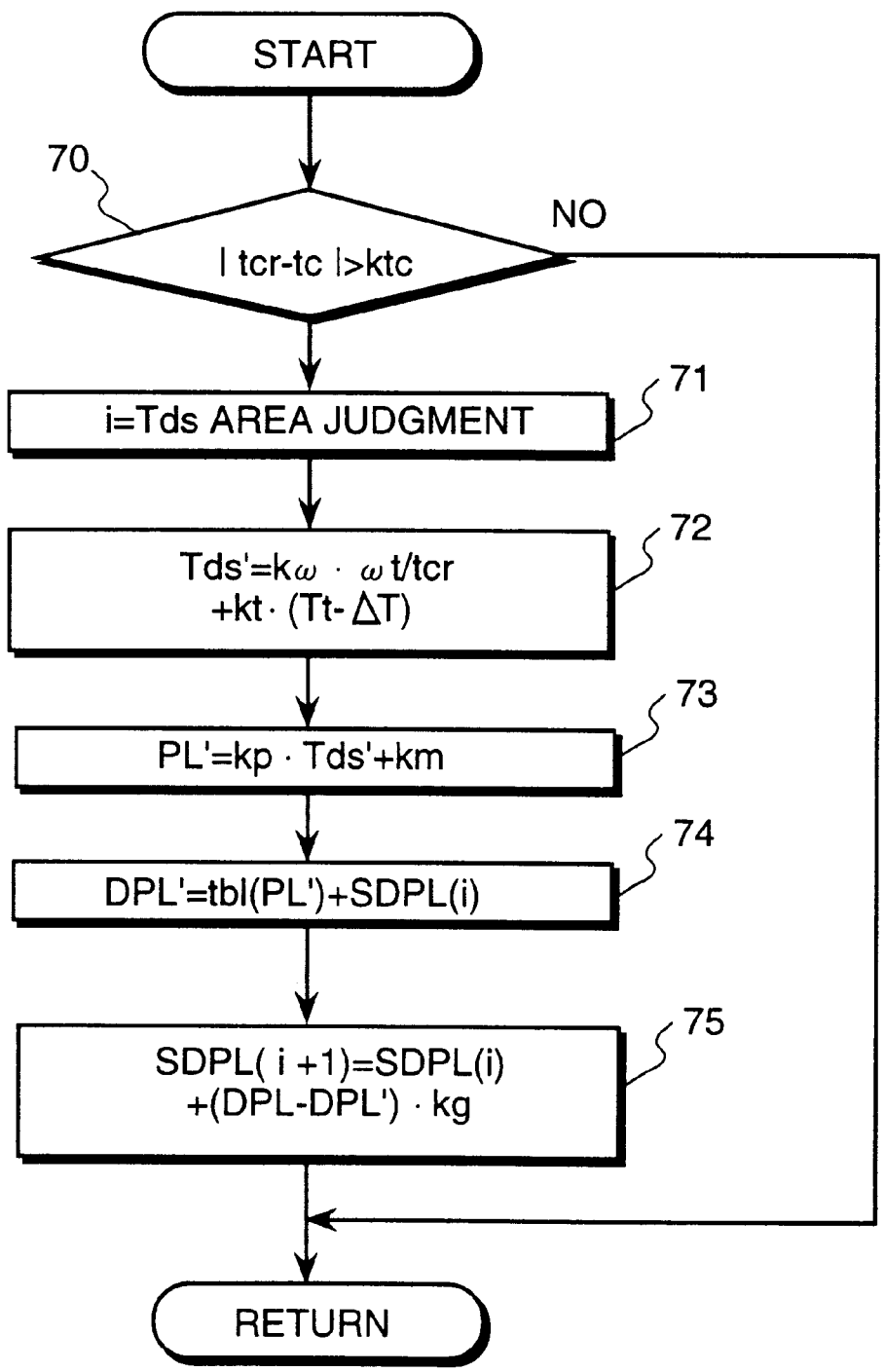
FIG. 10 is a flow chart showing a leaning control in a shift time according to the present invention.

A concrete logic for determining the learning correction value will be explained referring to a flow-chart of the learning control shown in FIG. 10.

In a step 70, it judges whether a difference between the actual shift time tcr and the control shift time tc is more than a predetermined value or not. In case that the difference is within the predetermined value, it merely returns. In case where the difference is more than the predetermined value, in a step 71, it judges the area of the actual control transmission torque Tds and an area number (i) is determined.

In a step 72 and a step 73, an actual estimation line pressure PL' is requested using the actual shift time tcr. In these calculation times, the turbine speed $\omega t$ and the turbine torque Tt used in the shift which is caused according to the time lag and the torque difference $\Delta T$ being the torque down value are employed.

In a step 74, the actual estimation duty ratio DPL' is requested by the line pressure—output duty ratio conversion table and the present time learning correction value SDPL(i).

In a step 75, a difference between the duty ratio DPL used for the control and the actual estimation duty ratio DPL' requested by the step 74 is requested and a correction amount is requested by multiplying the predetermined gain kg.

Further, the present time learning correction value SDPL (i) is added, therefore a new learning correction value SDPL(i+1) is obtained. Herein, the gain kg is less than 1 and this gain kg is determined under consideration of a stability of the control of the shift.

As stated in above, according to the present invention, since the operation pressure of the friction part and the reduction amount of the torque relating to the shift are determined by the turbine angular speed and the turbine torque, thereby the shift shock can be suppressed. Further, the shift time can control stably at a predetermined time. Further, since the constants used for the control are requested by the basic design values of the friction part, the data calibration process in the development design for the control can be reduced.

We claim:

1. In a control apparatus for an automatic transmission of a vehicle having an engine and an automatic transmission configured to shift according to a shift command signal for indicating a shift, comprising a target shift time determination apparatus for determining a target shift time;

a transmission torque determination apparatus for determining a transmission torque of a friction part in accordance with an input rotation speed and an input torque of an output shaft of said automatic transmission and said target shift time;

a target torque determination apparatus for determining a target torque during a shift of an output shaft of said automatic transmission;

an engine output torque alteration apparatus for generating a signal which alters an output torque of said engine in accordance with a difference in torque between said transmission torque and said target torque;

a control transmission torque determination apparatus for determining an actual control transmission torque supplied to said friction part in accordance with said torque difference and said transmission torque;

a friction part control apparatus for supplying said operation force to said friction part; and an operation force control value determination apparatus for determining a control value responsive to an operation force for engaging with said friction part in accordance with said control transmission torque and for generating a signal which is based on said control value to said friction part control apparatus; wherein said transmission torque determination apparatus determines said transmission torque in accordance with said shift ratio between before shift and after shift, an inertia moment accompanied with a rotating part of an interior portion of said automatic transmission, a coefficient determined in accordance with said target shift time, said input rotation speed, said input torque, and a predetermined value determined in accordance with a shift type.

2. A control apparatus for an automatic transmission according to claim 1, wherein when said transmission torque is smaller than said target torque, said engine output torque alteration apparatus is configured to stop an alternation of said output torque of said engine.

3. A control apparatus for an automatic transmission according to claim 1, wherein said operation force is a hydraulic pressure.

4. A control apparatus for an automatic transmission according to claim 1, wherein said operation force is an electromagnetic force.

5. A control apparatus for an automatic transmission according to claim 1, wherein said transmission torque determination apparatus determines said transmission torque in accordance with a rotation speed and an input torque which are inputted to said friction part at a time immediately before a shift start.

6. A control apparatus for an automatic transmission according to claim 5, wherein said time immediately before the shift start is after a predetermined time from an occurrence of said shift command signal.

7. A control apparatus for an automatic transmission according to claim 5, wherein said time immediately before the shift start is a time between an occurrence of said shift command signal and an engagement or a release of said friction part.

8. A control apparatus for an automatic transmission according to claim 1, wherein said target torque determination apparatus determines said target torque in accordance with an output torque of said engine.

9. A control apparatus for an automatic transmission according to claim 1, wherein when a load of said engine changes by more than a predetermined value during the shift, said operation force control value determination apparatus generates a control value for controlling said operation force to said friction part in accordance with said engine load.

10. A control apparatus for an automatic transmission according to claim 1, wherein said operation force control value determination apparatus generates a control correction value to correct said operation force to said frictional force in accordance with a difference between an actual control time and a target control time in every predetermined range of said transmission torque.

11. In a control method for an automatic transmission of a vehicle having an engine and an automatic transmission which shifts according to a shift command signal for indicating a shift, comprising the steps of:

determining a target shift time;

determining a transmission torque of a friction part in accordance with an input rotation speed and an input torque of an output shaft of said automatic transmission and said target shift time;

determining a target torque during a shift of an output shaft of said automatic transmission;

generating a signal which alters an output torque of said engine in accordance with a difference in torque between said transmission torque and said target torque;

determining an actual control transmission torque supplied to said friction part in accordance with said torque difference and said transmission torque;

supplying said operation force to said friction part; and determining a control value responsive to an operation force for engaging with said friction part in accordance with said control transmission torque and for generating a signal which is based on said control value to a friction part control for supplying said operation force to said friction part control apparatus; wherein said transmission torque is determined in accordance with said shift ratio between before shift and after shift, an inertia moment accompanied with a rotating part of an interior portion of said automatic transmission, a coefficient determined in accordance with said target shift time, said input rotation speed, said input torque, and a predetermined value determined in accordance with a shift type.

12. A control method for an automatic transmission according to claim 11, wherein when said transmission torque is smaller than said target torque, an alternation of said output torque of said engine is stopped.

13. A control method for an automatic transmission according to claim 11, wherein said operation force is a hydraulic pressure.

14. A control method for an automatic transmission according to claim 11, wherein said operation force is an electromagnetic force.

15. A control method for an automatic transmission according to claim 11, wherein said transmission torque is determined in accordance with a rotation speed and an input torque which are inputted to said friction part immediately before a shift start.

16. A control method for an automatic transmission according to claim 15, wherein said immediately before the shift start occurs after a predetermined time from an occurrence of said shift command signal.

17. A control method for an automatic transmission according to claim 15, wherein said immediately before the shift start occurs between said shift command signal and an engagement or a release of said friction part.

18. A control method for an automatic transmission according to claim 11, wherein said target torque is determined in accordance with an output torque of said engine.

19. A control method for an automatic transmission according to claim 11, wherein when a load of said engine changes by more than a predetermined value during the shift, a control value for controlling said operation force to said friction part is generated in accordance with said engine load.

20. A control method for an automatic transmission according to claim 11, wherein a control compensation value to compensate said operation force to said frictional force is generated in accordance with a difference between an actual control time and a target control time in every predetermined range of said transmission torque.

21. In a control apparatus for an automatic transmission of a vehicle having an engine and an automatic transmission configured to shift according to a shift command signal for indicating a shift, comprising an input shaft rotation speed detection for detecting a rotation speed of an input shaft of said automatic transmission;

an input shaft torque detection for detecting or executing a torque of said input shaft; and a transmission torque execution apparatus for executing a transmission torque during the shift in accordance with the rotation speed and torque of said input shaft.

22. In a control apparatus for an automatic transmission of a vehicle having an engine and an automatic transmission configured to shift according to a shift command signal for indicating a shift, comprising a target shift time determination apparatus for determining a target shift time;

an input shaft rotation speed detector for detecting a rotation speed of an input shaft of said automatic transmission;

an input shaft torque detection for detecting or executing a torque of said input shaft;

a transmission torque execution apparatus for executing a transmission torque during the shift in accordance with the rotation speed and torque of said input shaft; and an operation force control apparatus for controlling an operation force of a friction part of said automatic transmission in accordance with said transmission torque.

23. In a control apparatus for an automatic transmission of a vehicle having an engine and an automatic transmission configured to shift according to a shift command signal for indicating a shift, comprising a target shift time determination apparatus for determining a target shift time;

an input shaft rotation speed detector for detecting a rotation speed (Nt) of an input shaft of said automatic transmission;

an input shaft torque detection for detecting or executing a torque (Tt) of said input shaft;

a transmission torque execution apparatus for executing a transmission torque (Td) during the shift in accordance with the rotation speed (Nt) and torque (Tt) of said input shaft, and said transmission torque (Td) is expressed by (a×Tt+b×Nt), wherein a and b are constants; and an operation force control apparatus for controlling an operation force of a friction part of said automatic transmission in accordance with said transmission torque.

24. In a control method for an automatic transmission of a vehicle having an engine and an automatic transmission configured to shift according to a shift command signal for indicating a shift, comprising the steps of:

detecting a rotation speed of an input shaft of said automatic transmission;

detecting or executing a torque of said input shaft; and executing a transmission torque during the shift in accordance with the rotation speed and torque of said input shaft.

25. In a control method for an automatic transmission of a vehicle having an engine and an automatic transmission configured to shift according to a shift command signal for indicating a shift, comprising the steps of:

determining a target shift time;

detecting a rotation speed (Nt) of an input shaft of said automatic transmission;

detecting or executing a torque (Tt) of said input shaft;

executing a transmission torque during the shift in accordance with the rotation speed and torque of said input shaft; and controlling an operation force of a friction part of said automatic transmission in accordance with said transmission torque.

26. In a control method for an automatic transmission of a vehicle having an engine and an automatic transmission configured to shift according to a shift command signal for indicating a shift, comprising the steps of:

determining a target shift time;

detecting a rotation speed (Nt) of an input shaft of said automatic transmission;

detecting or executing a torque (Tt) of said input shaft;

executing a transmission torque (Td) during the shift in accordance with the rotation speed (Nt) and the torque (Tt) of said input shaft, said transmission torque (Td) being expressed by (a×Tt+b×Nt), wherein a and b are constants; and controlling an operation force of a friction part of said automatic transmission in accordance with said transmission torque.

* * * * *